United States Patent [19]

Bruck

[11] 3,775,567

[45] Nov. 27, 1973

[54] APPARATUS AND METHOD FOR SELECTIVELY PROVIDING FOR SHIFTING ROTARY MAGNETIC HEADS OF TAPE TRANSPORT CIRCUMFERENTIAL

[75] Inventor: George Bruck, Cincinnati, Ohio

[73] Assignee: Avco Corporation, Greenwich, Conn.

[22] Filed: Jan. 28, 1971

[21] Appl. No.: 110,493

[52] U.S. Cl. 179/100.2 CA, 178/6.6 P, 179/100.2 T

[51] Int. Cl. ........................ G11b 5/52, G11b 21/10

[58] Field of Search ............ 179/100.2 T, 100.2 CA; 178/6.6 P

[56] References Cited

UNITED STATES PATENTS 3,029,318 4/1962 Fay et al. .................. 179/100.2 CA

*Primary Examiner*—Bernard Konick

*Assistant Examiner*—Robert S. Tupper

*Attorney*—Townsend and Townsend

[57] ABSTRACT

Apparatus and method for compensating for the stretching or shrinking of a magnetic tape used with a tape transport of the type having one or more heads mounted on a rotor for rotation about a central axis. The heads are adapted for movement in scanning relationship to the magnetic tape when the latter is disposed adjacent to and movable along at least a portion of the arcuate path of travel of the heads. The heads are shiftably coupled to the rotor to permit movement of the heads circumferentially of the path of travel of the rotor and the heads are shifted lengthwise of the tape to compensate for head position errors due to changes in the length of the tape caused by shrinkage or stretching.

11 Claims, 3 Drawing Figures

INVENTOR.
GEORGE BRUCK
BY Townsend and Townsend
ATTORNEYS

APPARATUS AND METHOD FOR SELECTIVELY PROVIDING FOR SHIFTING ROTARY MAGNETIC HEADS OF TAPE TRANSPORT CIRCUMFERENTIAL

This invention relates to improvements in tape transports of the type having rotatable transducer means and, more particularly, to apparatus and a method for compensating for shrinkage and stretching of a movable magnetic tape having prerecorded signal tracks thereon.

It is the current practice in the use of video tape recorders and reproducers to utilize the entire surface of a magnetic tape for recording and playing back information on the tape. One approach is to record the information on oblique tracks extending across the tape. In such a case, each track may be of the length of 8 inches to 10 inches on a tape having a width of one-half inch with each track representing an entire field of a video image. The information on each track is retrieved by causing one or more rotating playback heads to scan the tape as the tape moves at a speed equivalent to the displacement of one track representing one video image field in one-sixtieth of a second. During the same time interval, each playback head moves along the entire track at a speed much greater than that of the tape.

If, for any reason, such as changes in temperature or humidity, or because of aging of the tape, the length of the tape has changed, the head in scanning a particular track will not cover the track properly so as to retrieve the information thereon. The tape must be moved forwardly through a displacement equivalent to one tape track in one-sixtieth of a second. This can be achieved by servo-controlling the forward speed of the tape. During the same period of time the head must be moved exactly one track length. These two conditions cannot be achieved simultaneously without special precautions. Generally, the head rotates along a path at a particular speed while a certain angular distance on the path corresponds to one video field or one track on the tape. The speed of rotation of the head cannot change because the rate by which the video fields are repeated must remain one-sixtieth of a second. On the other hand, an elongated or shortened record track on the tape does not correspond to the proper angular motion of the head.

Among the many methods which have been used in the past to compensate for undesirable tape stretch or shrinkage is one which has proven to be rather successful. In this method, the tape is pre-stretched to a certain average level during recording, and on playback, the tape is stretched more or less to make its physical length identical to the length of the tape at the time of recording. This method is satisfactory except for the fact that the stretch of the tape causes an increase in contact pressure between the tape and the support means on which the heads are mounted, resulting in increased friction and wear of both the tape and the support means. To carry out this method, high quality expensive tape material must be used.

The present invention provides a solution to the above problem without requiring changes in the rotational speed of the head as it rotates about its central axis. The invention is premised upon the fact that the relative speed between the tape and the head can be increased or decreased by imparting to the head a forward or reverse speed with respect to the head support means which mounts the head for rotation. Thus, during the playback phase, the speed between the tape and the head can be made greater or less than the speed between the mounting means and the tape. This forward or reverse speed of the head is maintained only during the time interval when the head is in scanning relationship to the tape, such interval corresponding to an angular travel of less than 180°. During the remaining portion of each revolution of the head, i.e., when the head is not in scanning relationship with the tape, the head is returned to an equlbrium position on the head support means so that the head will be properly positioned to scan the tape during the next pass of the head along the tape.

The head, in effect, performs an oscillatory motion with respect to the support means therefor. At least one part of this motion can be fairly linear. This is the motion during which the record tracks on the tape are scanned. During the remainder of each revolution, the motion of the head can be arbitrary because the head has only to return to its initial position without scanning any tape record tracks.

The motion of the head can be achieved by coupling it to one end of an arm pivotally mounted on a rotor with the opposite end of the arm being in engagement with a cam surface of a cam. By mounting the cam for movement relative to the rotor, the cam can be moved into any one of a number of operative positions. In any such position, the cam operates to displace the head relative to and circumferentially of the rotor as the head scans the working arc of a magnetic tape. In this way, the movement of the head is caused to compensate for tape stretch or shrinkage, the cam being positionable either for slightly increasing the relative speed between the head and the tape or for slightly decreasing such relative speed. Such increase or decrease of this relative speed will be sufficient to cause the head to scan a record track on the head.

Any suitable control can be used to change the operative position of the cam. For instance, a manual control can be used, such control being generally operated when it is visually observed that the resulting video picture is not a correct reproduction of the video signal. In the alternative, an automatically actuated control can be used. An error signal must be generated to actuate such a control.

The primary object of this invention is, therefore, to provide improved apparatus and a method for compensating for stretch or shrinkage of a magnetic tape when used with a tape recording and reproducing system of the type having one or more rotatable heads on a rotor wherein each head is mounted so that it can be moved relative to the rotor and longitudinally of the tape as the head moves with the rotor in scanning relationship to the tape so that changes in the speed of movement of the heads relative to the tape can be effected without changing the speed of the rotor relative to the tape speed.

Another object of this invention is to provide apparatus of the type described wherein the speed of movement of each head can be increased or decreased relative to the speeds of the tape and the rotor during a portion of each revolution of the rotor, so that the head speed can be made to change relative to that of the tape and the rotor when the head is in scanning relationship to the tape.

Other objects of this invention will become apparent as the following specification progresses, reference being had to the accompanying drawings for illustrations of an embodiment of the invention. In the drawings.

Figure 1:
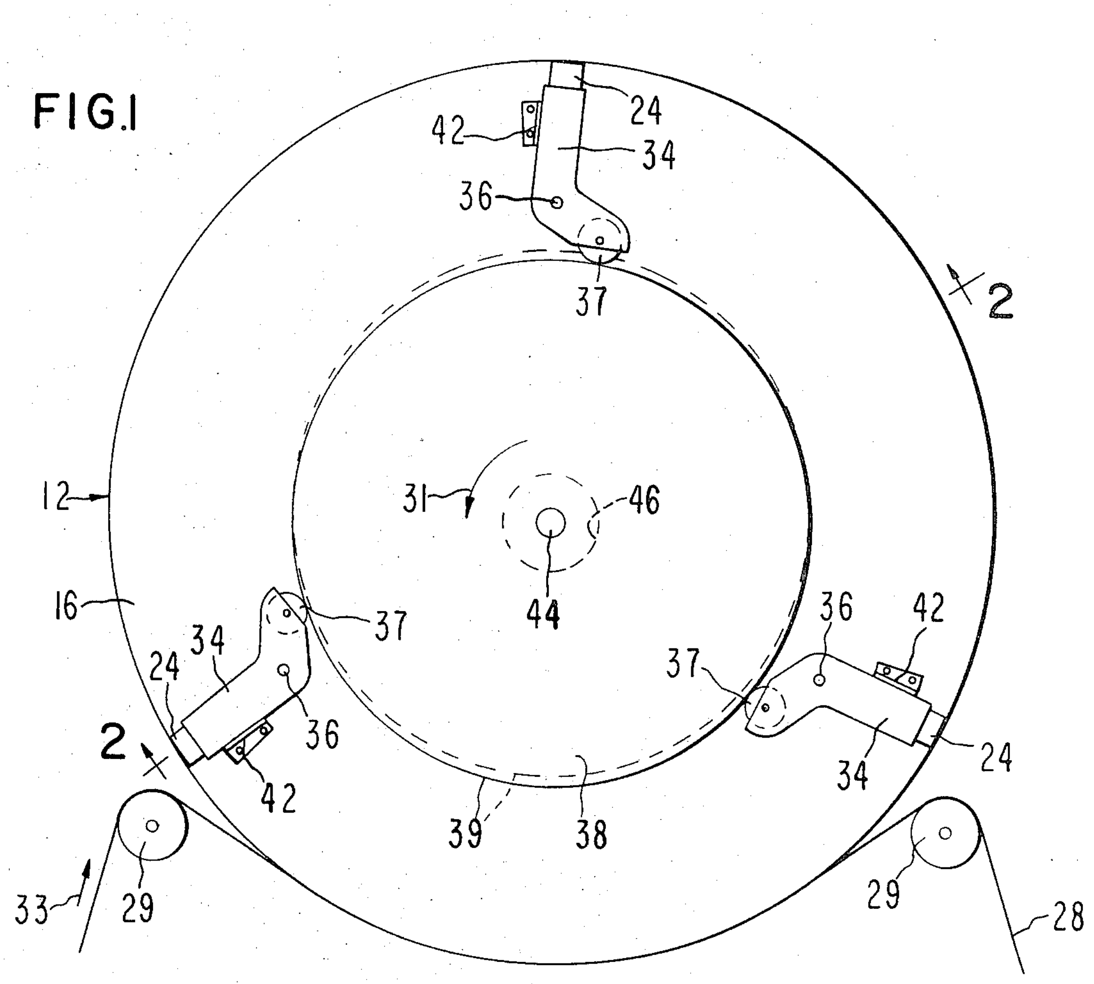
FIG. 1 is a top plan view of a portion of a tape transport system showing a number of spaced heads shiftably mounted on a rotor for rotation past a cam.
Figures 2, 3:
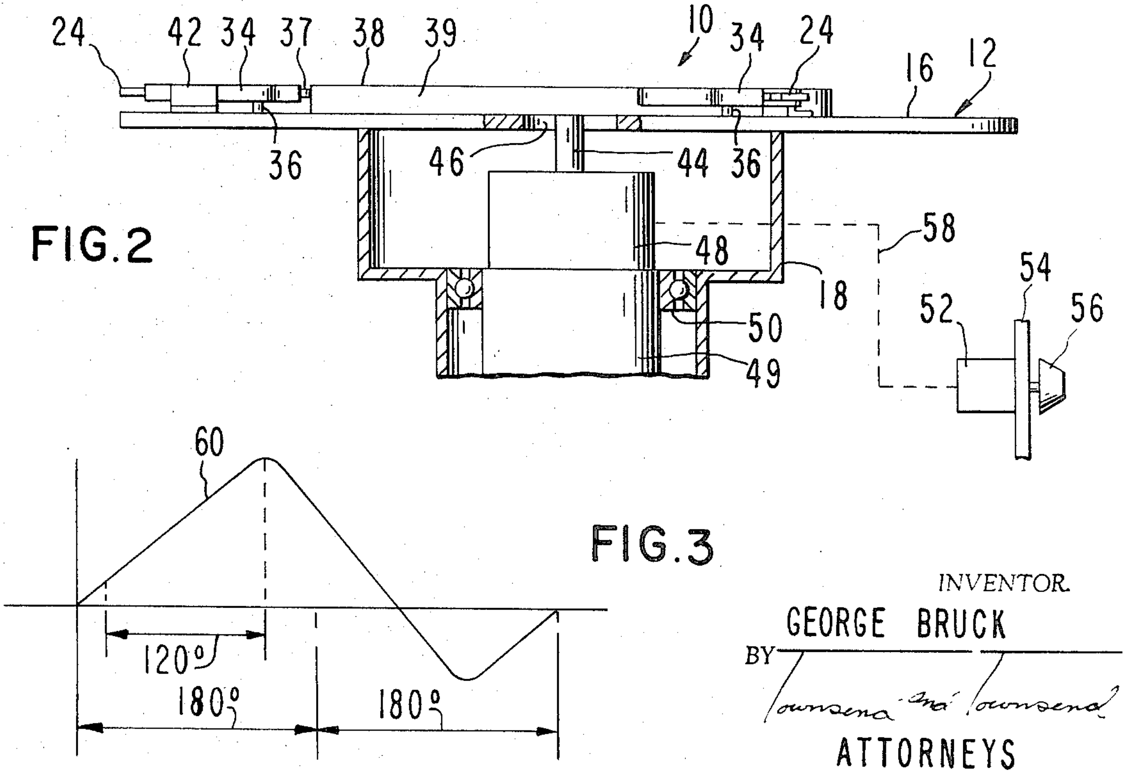
FIG. 2 is a side elevational view, partly in section, of the shiftable support for the cam and the mount for the rotor.
FIG. 3 is a graphic view of the path of movement of a head with respect to a complete revolution of the rotor.

An embodiment of the invention is illustrated in FIGS. 1 and 2 wherein a portion of a tape transport system 10 includes a disk-like rotor 12 having a surface 16 on which a number of heads 24 are disposed. Each head is rigidly secured to the outer end of an arm 34 pivoted by means of a pin 36 to surface 16. The inner end of each arm 34 has a roller 37 which engages the outer cam surface 39 of a cam 38 which does not rotate with the disk but is adjacent to surface 16. A leaf spring 42 is provided for each arm 34, respectively, each spring serving to bias the arm in a clockwise direction when viewing FIG. 1. Thus, each roller 37 is biased into engagement with cam surface 39.

Rotor 12 is rigidly coupled to the upper end of a tubular drive shaft 18 (FIG. 2) coupled to a drive motor (not shown) so that the disk can be caused to rotate about its central axis to carry heads 24 past and in scanning relationship to the working arc of a flexible magnetic tape 28 disposed in a position adjacent to and along a portion of the outer periphery of the rotor (FIG. 1), by a pair of spaced tape guides 29. The guides can form parts of a shiftable tape guide system which operates to pull a stretch of the tape out of a tape cartridge and partially about rotor 12 to define such working arc. The tape will be arranged at a helix angle relative to the rotor periphery and the speeds of the rotor and tape will be selected so that oblique record tracks on the tape will be scanned by the heads as the rotor rotates in the direction of arrow 31 and as the tape moves in the direction of arrow 33.

Cam 38 is mounted for movement relative to the rotor through a limited distance in any suitable manner. The shiftability of the cam allows it to move into any one of a number of operative positions so that adjustment can be made in the amount by which the heads are caused to shift relative to the rotor as the heads scan the working arc of the magnetic tape. In this way, the head positions can be changed to compensate for stretching or shrinking of the tape and assure that the heads will properly scan the tracks on the tape even though the tape has stretched or shrunk.

Any suitable means can be used to shift the cam relative to the rotor. For purposes of illustration, the cam has a shaft 44 which extends downwardly therefrom and through a circular opening 46 in the rotor. An actuatable power device 48 is coupled to shaft 44 and is mounted within shaft 18 on a support 49. A bearing 50 allows shaft 18 to rotate relative to support 49. Power device 48 operates to move shaft 44 relative to support 49 toward and away from the working arc of tape 28 and into any one of a number of operative locations within opening 46. Shaft 44 will be moved through a distance sufficient to shift cam 38 into a position at which surface 39 of the cam will cause movement of the heads 24 in the proper direction and by the proper amount to cause the heads to compensate for tape stretching or shrinking as the heads scan the working arc of the tape between guides 29.

Power device 48 can be actuated either manually or automatically. For purposes of illustration, a manual control 52 is shown in FIG. 2, the control being mounted in an accessible location on a panel 54 of tape transport 10 and having a control knob 56 coupled thereto. The dashed line 58 represents the coupling between power device 48 and control 52. By manipulating knob 56, the control is actuated to, in turn, actuate power device 48 to cause shaft 44 to shift relative to rotor 12 to a preselected operative location within opening 46. In the alternative, power device 48 can be automatically actuated to compensate for tape stretch or shrinkage. In this case, an error signal corresponding to the amount of tape stretch or shrinkage must be generated, the error signal being used to actuate the power device. Apparatus for generating such an error signal can be similar to the type disclosed in U.S. Pat. No. 3,213,913.

If the tape, during use, has undergone substantially no shrinkage or stretching between the recording phase and the playback phase, the heads will scan the record tracks on the tape without requiring adjustments in the head positions on the rotor. In such a case, the central axis of cam 38 will coincide with the axis of rotor 12. The heads will, therefore, remain fixed with respect to the rotor as they scan the working arc of tape 28.

If the tape has stretch or shrunk due to any reason, such as changes in humidity, temperature or other atmospheric conditions, the record tracks will also stretch or shrink proportionately. Thus, it will be necessary to cause a change in the position of each head relative to the rotor as the head scans the working arc of the tape to assure that the head traverses each record track properly. The operator can visually detect when correction is necessary because the picture quality on the monitor will be poor, assuming the use of a manual control for actuating picture device 48. The manual control is then manipulated to actuate power device 48 to, in turn, cause movement of cam 38 in the proper direction and by an amount sufficient to bring the picture quality up to an acceptable standard. While only a single manual control has been illustrated and described, it is possible to use several such controls to cause movement of cam shaft 44 to the proper operative location within opening 46 to eliminate the poor picture quality. When the cam is in an operative position for moving the heads, shaft 44 will be displaced laterally of the axis of rotation of rotor 12.

To compensate for a tape stretch condition, the cam will be moved to a location at which each head commences the scanning of the working arc of the tape when the head is at its normal or zero-displacement position with respect to the rotor. With the cam so positioned, the location on cam surface 39 corresponding to the movement of the head out of scanning relationship to the tape will be that which causes the head to be moved the maximum circumferential distance with respect to the rotor. For purposes of illustration in FIG. 3, the scanning of the tape 28 by each head 24 will occur during the time rotor 12 rotates through an arc of approximately 120° and each head will follow this same course for this particular portion of each revolution of the rotor.

The shrinkage or stretching of the tape will be substantially uniform along the length of the working arc of the tape. This uniformity will, therefore, result in a uniform change in the angle of each track on such working arc.

Curve 60 of FIG. 3 illustrates the displacement of each head 24 for a tape stretch condition, curve 60 having a positive slope during the 120° portion of the revolution of rotor 12 in which the head scans the working arc of tape 28. The displacement of each head on either side of this 120° portion is not important so long as the head remains substantially linear during such 120° portion. Since cam 38 is circular, the displacement of each head will have a negative slope after the head passes the end of the 120° portion, and finally assumes the positive slope of curve 60 before the head again commences to scan tape 28.

The displacement of cam 38 will determine both the maximum displacement of the head circumferentially of the rotor and the slope of the displacement curve. Thus, to compensate for a tape shrinkage condition, the cam will be moved to a location at which it causes the maximum circumferential displacement of the head as the head commences to scan the tape. This maximum displacement will be in a direction opposite to the direction of rotation of the rotor 12. The minimum displacement will occur as the head leaves the working arc of the tape. The curve of the displacement will then have a negative slope as distinguished from the positive slope of curve 60.

I claim:

1. In a tape transport system: a rotor having a central axis; means coupled with the rotor for rotating the same about said central axis; a plurality of heads adapted to scan a magnetic tape; means mounting the heads on the rotor for rotation therewith about said central axis and for rotation relative thereto about respective axes substantially parallel to said central axis to permit circumferential movement of the heads relative to the rotor as the latter rotates about said central axis; and means coupled with said head mounting means for moving each head in one direction relative to said rotor during a portion of each revolution thereof about said central axis.

2. In a tape transport system: a rotor; means mounting the rotor for rotation about a central axis; means coupled with the rotor for rotating the same; a head; means mounting the head on the rotor for movement relative thereto about an axis parallel to said central axis and circumferentially of the path of travel of the rotor; and cam means coupled with the head mounting means for moving the same in said direction relative to said rotor as the latter rotates during only a portion of each revolution thereof about said axis.

3. In a tape transport system: a rotor having a central axis and adapted to be mounted for rotation about said central axis; a magnetic tape; means coupled with said tape for positioning a stretch of the tape in conformity with a portion of the circular path of travel of the outer extermity of the rotor; a plurality of heads; means shiftably mounting each head, respectively, on said rotor at a location spaced from the other heads with each head being disposed to scan said tape stretch as the rotor rotates about said axis, said heads being rotatable independently of each other and relative to the rotor in opposed directions about respective axes substantially parallel to said central axis, so that said heads can move circumferentially of said arcuate path of travel; and cam means coupled with said head mounting means and responsive to the angular position of the rotor for moving each head about its respective axis relative to the rotor.

4. In a tape transport system: a rotor having an outer extremity; means mounting the rotor for rotation about a central axis; means coupled with the rotor for rotating the same about said central axis; a head; means mounting the head on the rotor adjacent to said outer periphery for rotation relative thereto circumferentially thereof about an axis substantially parallel to said central axis and spaced inwardly from said outer periphery; and means coupled with the head mounting means and responsive to the angular position of the rotor for moving the head relative to and circumferentially of the rotor.

5. In a tape transport system as set forth in claim 4, wherein said moving means includes a cam having a continuous cam surface, said mounting means including an arm shiftably mounted on the rotor and normally engaging said cam surface to cause movement of the head as a function of the position of the rotor relative to the cam.

6. In a tape transport system as set forth in claim 5, wherein said arm has a pair of opposed ends, said head being secured to one end of the arm, and including a roller at the opposite end of the arm, and means biasing said roller into engagement with said cam surface.

7. In a tape transport system as set forth in claim 5, wherein is included means coupled with said cam for shifting the same relative to said rotor.

8. A method for compensating for dimensional changes in a tape having record tracks thereon and forming a part of a tape transport system of the type having a rotor rotatable about a central axis and a transducer carried by the rotor and rotatable thereon about an axis parallel to said central axis comprising: rotating the rotor and the transducer about said central axis; moving the tape in one direction along at least a portion of the path of travel of the rotor and the transducer as the latter rotate whereby the transducer can scan a record track on the tape; and rotating the transducer in one direction about said parallel axis to change the rotational speed of the transducer relative to the tape only when the transducer is adjacent thereto with the speed change being sufficient to maintain the transducer in scanning relationship to a record track on the tape.

9. A method for compensating for dimensional changes in a magnetic tape having a number of record tracks thereon and defining a part of a tape transport system of the type having a rotor rotatable about a central axis and a number of spaced heads carried by the rotor and rotatable thereon about respective axes parallel to said central axis comprising: rotating said rotor about said central axis; moving the tape along a portion of the path of travel of the rotor and the heads as the latter rotate, whereby the heads can successively scan the record tracks on the tape; and rotating each head in one direction about its respective axis to change the speed of the head relative to the tape and independently of the other heads only while the head scans the tape with the speed change being sufficient to maintain the head in scanning relationship to the adjacent record track of the tape.

10. A method as set forth in claim 9, wherein said changing step includes moving each head circumferentially of said head path as a function of the arcuate position of the head along said path.

11. A method as set forth in claim 9, wherein said changing step includes rotating said head about an axis parallel with said central axis.

* * * * *